United States Patent [19]

Zeising

[11] Patent Number: 4,651,288

[45] Date of Patent: Mar. 17, 1987

[54] METHOD AND APPARATUS FOR FILLING OUT A FORM BY A MACHINE

[75] Inventor: Norbert Zeising, Oldenburg, Fed. Rep. of Germany

[73] Assignee: Olympia Werke AG, Wilhelmshaven, Fed. Rep. of Germany

[21] Appl. No.: 668,853

[22] Filed: Nov. 6, 1984

[30] Foreign Application Priority Data

Nov. 11, 1983 [DE] Fed. Rep. of Germany ....... 3340831

[51] Int. Cl.⁴ .............................................. G06F 15/20
[52] U.S. Cl. ..................................... 364/519; 400/62; 364/900
[58] Field of Search ...................... 354/8, 9; 364/519; 400/1, 2, 9, 61, 68, 62

[56] References Cited

U.S. PATENT DOCUMENTS

| | | | |
|---|---|---|---|
| 3,810,197 | 5/1974 | Piccone | 554/9 |
| 3,968,868 | 7/1976 | Greek, Jr. et al. | 400/2 |
| 4,298,290 | 11/1981 | Barnes et al. | |
| 4,403,301 | 9/1983 | Fessel | 400/62 |

FOREIGN PATENT DOCUMENTS 3046037 7/1982 Fed. Rep. of Germany.
3149391 6/1983 Fed. Rep. of Germany.
595214 2/1978 Switzerland.

Primary Examiner—Russell E. Adams
Attorney, Agent, or Firm—Spencer & Frank

[57] ABSTRACT

A method and an arrangement for filling out a form by means of a processor-controlled typewriter or similar machine which includes a form memory. The text keyed in, which is to be printed in a text field on the form defined in the form memory, is stored in a text memory of the machine. The size of the area required for printout of the text, considering a given line and character spacing, is compared with the area available in the intended text field. If necessary, the line and/or character spacing is automatically changed before printout so as to adapt the text to the boundaries of the text field. With a suitable printing mechanism, it is also possible to change the size of the characters.

9 Claims, 3 Drawing Figures

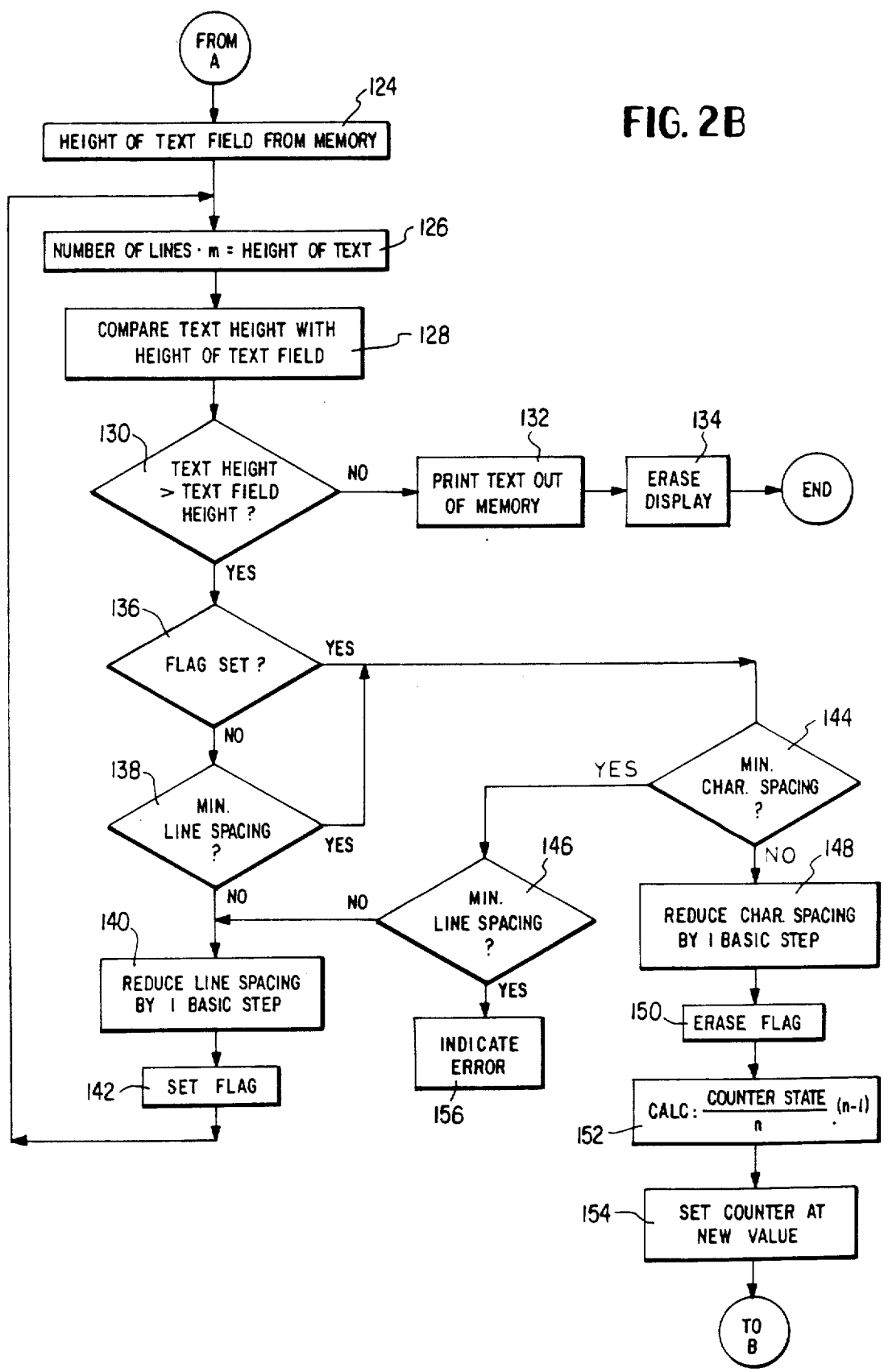

METHOD AND APPARATUS FOR FILLING OUT A FORM BY A MACHINE

BACKGROUND OF THE INVENTION

The present invention relates to a method for filling out a form by means of a processor-controlled typewriter or similar machine and to an apparatus for implementing this method.

Filling out forms is particularly difficult for the operator of a typewriter because the texts must be entered in fields of limited size disposed at various locations on the form. Modern processor-controlled machines often include a form memory in which the outlines and the position of the individual text fields can be stored in memory by, for example, positioning the printing carriage to identify the corner points of the individual text fields on a form clamped into the machine and operating the appropriate input keys. The memory then contains the starting position for the text in each text field as well as information about the width and height of the field. When a form is to be filled out in the forms mode of the machine, the typing position of the carriage, after it has been set to the starting location, is then automatically moved within the outlines of the text field, i.e. the righthand edge of the text field is evaluated as the right margin, the lefthand edge is evaluated as the left margin, and the bottom of the field is evaluated as the bottom edge.

Although this considerably facilitates the filling out of forms for an operator, a further difficulty still exists in that the length of the text must not exceed the size of the respective text field. Thus, the operator is constantly occupied with counting the number of characters and lines to be put in so as not to exceed the capacity of the text field and will frequently have to depress the margin release key in order to continue the text beyond the intended limits of the text field.

SUMMARY OF THE INVENTION

It is the object of the present invention to further simplify the machine-assisted filling out of forms and to free the machine operator of time consuming manipulation tasks.

This is accomplished according to the present invention by conducting a comparison, before the text stored in a text data memory is printed on a form in an addressed text field having boundaries which accommodate a predetermined text line length, between the predetermined line length and the length of the text to be printed on one or more lines within the text field, and then, if the predetermined length of the text field is exceeded, reducing the character and/or line spacing to condense the text.

The advantages of the present invention are, in particular, that forms can be filled out without any more operator attention than is normally required for operating a typewriter and nevertheless, the forms are filled out in an orderly manner which respects the outlines of the individual text fields. Within a wide tolerance range it is also possible for the text field to accommodate texts of a length which, with preset numbers of characters and/or lines, would go beyond the limits set for the respective field. Processing of forms is thus simplified considerably.

BRIEF DESCRIPTION OF THE DRAWINGS

FIGS. 2A and 2B are is a flow chart illustrating how the apparatus of FIG. 1 is controlled to print forms.

DESCRIPTION OF THE PREFERRED EMBODIMENT

Figure 1:
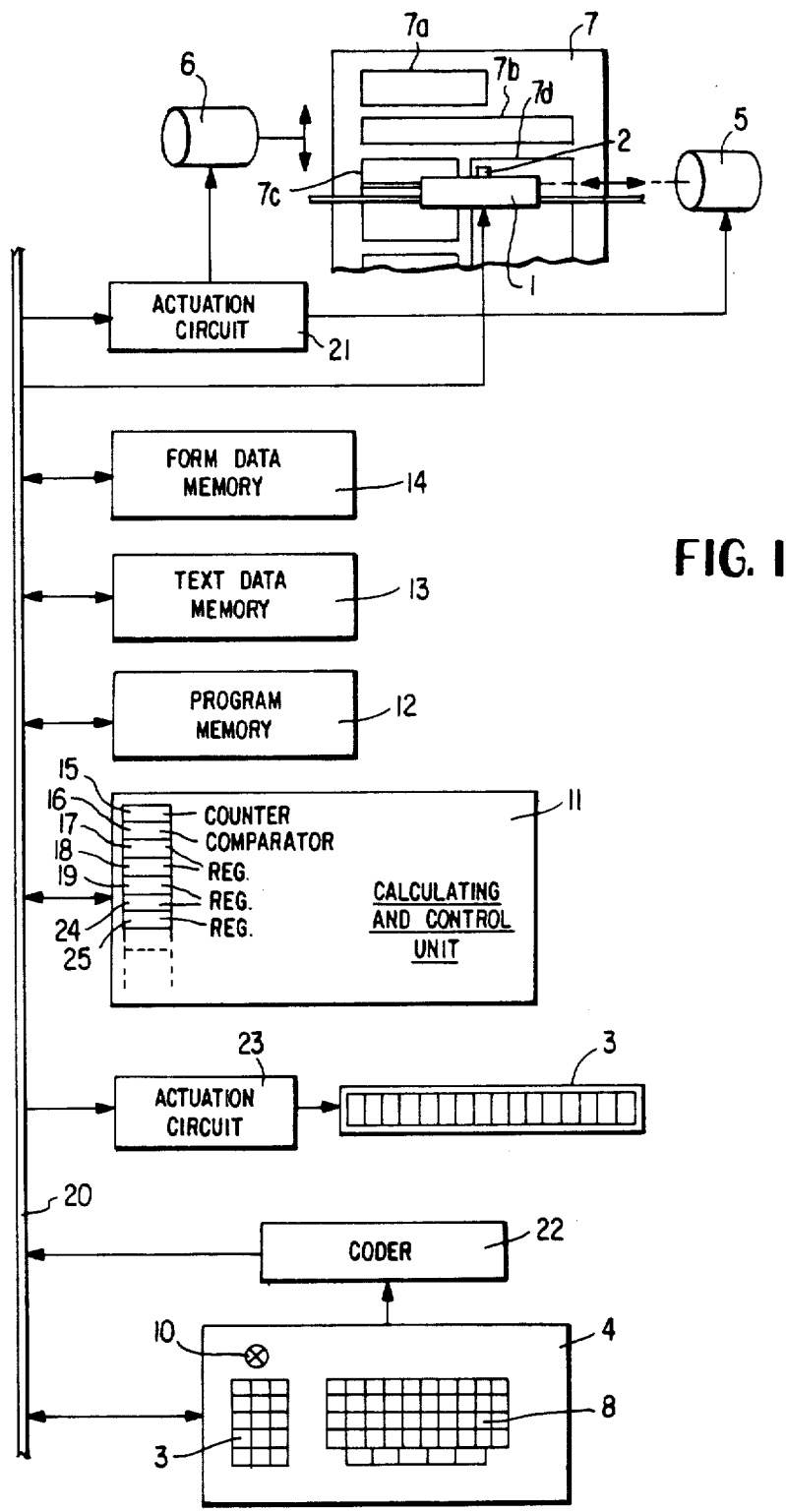
FIG. 1 is a circuit block diagram of an apparatus according to the present invention for filling out forms.

FIG. 1 illustrates a memory typewriter which includes a dot matrix printing mechanism 1 having an ink printing head 2 for character output and a line display device 3 to display alphanumeric data keyed in by way of a keyboard 4. Ink printing head 2 is equipped with a number of nozzles arranged one below the other which, when actuated simultaneously, are capable of producing a corresponding column of ink dots on a record carrier 7. By step-wise horizontal displacement of printing mechanism 1 and repeated actuation of the respective printing nozzles, it is thus possible to produce a matrix field of dots which covers the area of a character and within which, if only several selected printing nozzles are actuated, any desired alphanumeric character can be printed in a known manner. Each character is thus produced as print head 2 is successively moved horizontally in a number of finely graduated basic steps, and the space between adjacent characters is likewise composed of a number of basic steps. A stepping motor 5 is provided for the horizontal displacement. It drives the printing mechanism 1 in correspondingly finely graduated steps. That is to say, the minimum distance by which motor 5 can move printing head 2 is one basic step, and greater displacements are achieved by moving head 2 an integer number of basic steps.

A further stepping motor 6 serves as the drive for the vertical advance of the record carrier 7 clamped into the machine. The vertical advance can also be performed in basic steps which, for example, have the size of the spacing of the nozzles in ink printing head 2. The printing position of printing mechanism 1 established by the nozzles of ink printing head 2 is thus adjustable in basic steps in the horizontal and vertical directions relative to record carrier carrier 7 by actuation of stepping motors 5 and 6. It should be noted that a basic step in the horizontal direction need not represent the same incremental distance as a basic step in the vertical direction.

Keyboard 4 has an alphanumeric key group 8 for character input and a function key group 9 for the input of instructions and operating conditions, and is also equipped with an error light 10. Display device 3 is designed in such a manner that at least part of a full line of text can be displayed so that the machine operator is able to control the accuracy of the text even if the characters keyed in are not printed out immediately thereafter.

The machine control is formed essentially by a microprocessor which includes, inter alia, a calculating and control circuit 11, a program memory 12, a text data memory 13 and a form data memory 14. Text and form data memories may of course also be parts of a single data memory. Program data memory 12 contains the program routines required to control the machine by way of the microprocessor. Additionally provided is a counter 15, a comparator 16 and a number of registers of which here only the registers for character spacing 17 and for a change in character spacing 25, the register for line spacing 18 and for a change in line spacing 24 as well as a flag register 19 relevant for an understanding of the invention are shown schematically in the drawing. Registers 17-19, 24, 25 may again be part of the data memory, while comparator 16 and counter 15 can also be represented by program controlled calculation functions in calculating and control circuit 11. The components of the control mechanism are connected together and with the peripheral components, i.e. keyboard 4, printing mechanism 1 and display device 3, by means of a common bus 20.

Figure 2A:
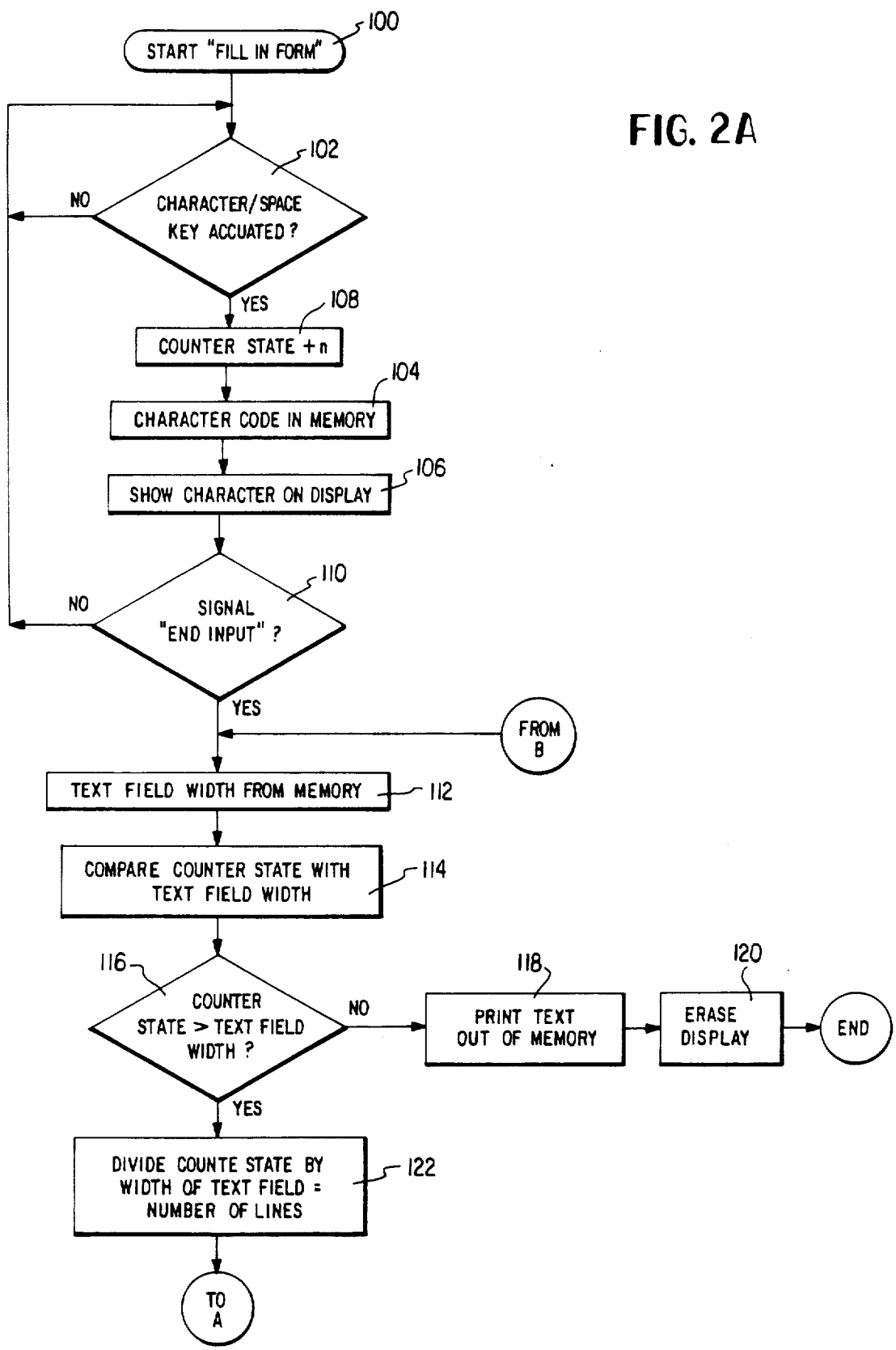

Let it be assumed now that the record carrier 7 clamped into the machine is a form which has various text fields 7a, 7b, 7c, 7d, etc. to be filled with text. If the form data are not yet stored in form data memory 14, an appropriate instruction is keyed via function key group 9. The field positions and field boundaries—that is, the field widths and field heights—are then identified by moving printing mechanism 1 and record carrier 7 with respect to each other in such a manner that the printing position of printing mechanism 1 (that is, the position of print head 2) successively occupies the left and right margin of the upper line as well as the lower edge of each text field, with appropriate keys in function key group 9 being actuated to permit machine control of the corresponding position data. The starting positions for the text, the width of the text field in basic steps, and the height of the text field in basic steps are then stored in form data memory 14 for each text field 7a, etc. The operator also supplies values for character and line spacing, these values being stored in character spacing register 17 and line spacing register 18, respectively. Upon input of the instruction "fill in form" (see block 100 in FIG. 2), counter 15 and flag register 19 are initialized to "0" and registers 24 and 25 for changed line and character spacings are erased. Filling in the form (on record carrier 7) can now begin and will be described below with the aid of the flow chart shown in FIGS. 2A and 2B.

A jump order actuated by means of function key group 9 causes the first text field 7a to be addressed, and printing mechanism 1 and record carrier 7 are displaced until the printing position (that is, the position of print head 2) comes to lie at the starting position of the first text field. The actuation controls required for this purpose for the two stepping motors 5 and 6 are supplied to an actuation circuit 21, which as a result generates the required motor actuation signals. Input signals from actuated character and space keys of alphanumeric group 8 are detected (block 102) and supplied to a coder 22, which derives the associated character data therefrom. These are stored (block 104), on the one hand, in text data memory 13 and are provided, on the other hand, to an actuation circuit 23 for a display on display device 3 (block 106). During the entire input process for the text field, printing mechanism 1 remains unchanged in its starting position. Each character input or space step also increases the content of counter 15 by an amount corresponding to the number n of basic horizontal steps stored in character spacing register 17 for the character spacing (see block 108). This amount n includes the number of required basic steps for the character itself and for a blank region following the character to space it from the subsequent character. Once the entire text to be entered into the text field has been keyed in, the "end input" key on function key field 9 is actuated (block 110). Calculating and control circuit 11 now cause the width (in basic steps) of the text field addressed by the position of the printing mechanism to be taken from form data memory 14 (block 112) and to be supplied, together with the count of counter 15, to comparator 16 for comparison (block 114). If the result (block 116) indicates that the width of the text field is equal to or greater than the counter of the counter, the text is immediately read out of text data memory 13 and printed (block 118) in the text field by printing mechanism 1. The display on display device 3 is erased (block 120).

If the comparison indicates, however, that the counter state is higher than the width of the text field, the calculating and control circuit 11 determines the number of text lines which would be required between the left and right boundaries of the text field by dividing the content of counter 15 by the width of the text field (block 122). Then the height of the text field in basic steps is obtained (block 124) from form data memory 14 and is supplied to the comparator 16. The number of lines needed is multiplied by the number m of basic vertical steps corresponding to the line spacing which the operator entered in line spacing register 18 so that the height of the text in basic steps results (126). The comparator 16 then compares (block 128) the height of the text with the height of the text field. If it is determined (block 130) that the height of the text field is equal to or greater than the height of the text, the text is printed out (block 132) within the text field outlines. The display on display device 3 is also erased (block 134).

If, however, the height of the text is greater than the height of the text field, flag register 19 is checked (blcok 136) to see if it is set or not. If the flag bit is zero, a further check is made (block 138) to see whether the line spacing given in line spacing register 18 is already the smallest spacing possible for the machine. If the answer to this question is negative, register 24 is set for a new line spacing which is less by one basic step than the actual line spacing (block 140). (During the first run, the actual line spacing has the value recorded in line spacing register 18, but during every further passage it has the changed value recorded in register 24.) Flag register 19 is then set (block 142) to indicate that the last operation resulted in a reduction of the text height.

A check now follows in the manner previously described to determine whether the text height is still greater than the height of the text field. If this is the case, a query is made—because flag register 19 is now set (see block 136)—to determine whether the horizontal character spacing is already at the minimum possible for the machine (block 144). If the character spacing is already at the minimum, a further check is made to see whether the line spacing also is already at the minimum possible for the machine (146). However if the horizontal character spacing is not already at the minimum, the actual character spacing is reduced by one basic step (block 148) and a corresponding value is stored in register 25 for the new character spacing. (During the first passage, the actual character spacing corresponds to the value recorded in character spacing register 17; during each further passage it corresponds to the value in register 25, representing the changed character spacing.) Flag register 19 is reset to zero (block 150) and the counter state is corrected (blocks 152 and 154) so that its contents now reflect the new character spacing, which has been reduced by one basic step. The new character spacing is calculated (block 152) based upon the number of characters and spaces that were keyed times the new character spacing, as follows:

counter state/old character spacing (old character spacing—1).

Then the above-described check is made again to determine whether the text in such condensed or reduced form now fits into the text field.

If the area required for the text is still too large, the above described sequences are repeated with the line spacing and character spacing being reduced alternately by one basic step. It may happen here that one of the two spacings reaches the smallest possible value for the machine and no further reduction is possible in this direction. Then the respective other spacing is checked immediately so that then the two dimensions are no longer reduced alternatingly, but only the dimension for which reduction is still possible. If in spite of application of all possible reductions in size the area required for the text still exceeds the size of the text field, no automatic printing on the part of printing mechanism 1 takes place; instead, error light 10 is actuated (block 156) to call the operator's attention to the fact that action on his part is required. If, however, the text field has been filled in automatically with a character and line spacing commensurate with the size of the text field, the operator can actuate a jump instruction key in function key group 9 to position printing mechanism 1 in the starting position of the next text field stored in form data memory 14 and can thus enable the printing mechanism control to fill in this now-addressed text field in the manner previously described.

Another possibility for adapting the size of the text to a limited text field, when a printing mechanism of the type employed in this embodiment is used, is to reduce the characters in height and/or width. With a dot matrix printing mechanism, in which the characters are displayed in a matrix of, for example, 8×12 dots, it is possible, to a limited extent, to reduce the horizontal as well as vertical number of dots so that the characters become smaller and thus character spacing and line spacing become smaller. For example, an 8×12 matrix might be reduced to 7×11. This applies of course to pin printers or printing mechanisms in which the characters are generated by deflection of an ink jet or printing stylus, etc.

The invention described for a printing method employing uniform character spacing is of course also applicable for so-called proportional spacing print types. While the reduction of line spacing could be performed, as described above, without changes, the calculation (block 152) and reduction of the length of a text line would have to be made based upon considerations of each individual character in the text to be printed. Although this would require a somewhat involved internal calculation and control sequence, it would not change anything in the basic idea of the invention.

Furthermore the invention is also not limited to printing mechanisms of the type mentioned in the embodiment; a normal typewriter is also suitable for the method according to the invention if line and character spacing can be divided into several steps with respect to drive and control. It is also not necessary to continuously alternate between reduction of line spacing and reduction of character spacing. The selection as to the priority with which the respective spacings are reduced can be made according to any other desired aspects. A screen displaying the form to be filled out may also be used as an input medium. A cursor can be used to mark the starting positions in a text field to be covered and the characters keyed in can be displayed initially without consideration of the text field outlines or boundaries. Only a subsequent instruction to adapt the size of the text to the text field would then actuate the abovedescribed sequence of functions and cause a change in the display on the screen. And of course simpler machines without a screen or display device may also be equipped with arrangements to implement the method according to the invention.

To facilitate understanding the foregoing description refers to a simple embodiment of the invention. That results in an automatic splitting of text in two or more lines when the text does not fit into the width of the text field, without considering hyphenating rules or even printing a hyphen at the end of a line following the first part of a split word.

In a more sophisticated embodiment the end of each line of an automatically rearranged text would be checked by the processor to determine whether or not it is constituted by a space or hyphen or is followed by a space. No space would be interpreted as a command to print a hyphen and the printer would operate accordingly.

A further improved embodiment could be implemented in a memory typewriter or text processor with an automatic hyphenation program. Machines of this kind are well known, for instance the text processors ES 180 and DISQUE, both manufactured by OLYMPIA WERKE AG, Federal Republic of Germany. A hyphenation program enable the processor to operate according to hyphenation rules. It could be used in the inventive method as well, thereby allowing the correct splitting and hyphenation of lines and words by the processor.

It will be understood that the above description of the present invention is susceptible to various modifications, changes and adaptations, and the same are intended to be comprehended within the meaning and range of equivalents of the appended claims.

What I claim is:

1. In a method for filling in a form by using a printing machine to print at least one line of text within an addressed text field having boundaries which accommodate a predetermined text line length, the printing machine including a movable printing mechanism which is able to print characters in different sizes, a processor to control the printing machine, form memory means for storing at least one of positions and sizes of text fields on forms so as to control the printing position movement of the printing mechanism within the boundaries of a text field, a text data memory from which stored text is printed out automatically, and means for presetting character and line spacing, the improvement comprising:

before the text stored in the text data memory is printed out on the form in the addressed text field, comparing the length of the stored text with the predetermined line length accommodated by the addressed text field, if the length of the stored text exceeds the predetermined line length, reducing at least one of the character and line spacing and reducing at least one of the width and height of the characters to condense the text; and activating the printing mechanism to print the condensed text.

2. The method of claim 1, wherein the printing machine includes drive means for moving the printing mechanism vertically and horizontally with respect to a record carrier, the movement taking place in vertical and horizontal basic steps of predetermined length, wherein the means for presetting character and line spacing comprises means for storing values corresponding to a plurality of basic horizontal steps for character width and space between characters and to a plurality of basic vertical steps for character height and space between lines, and wherein the step of reducing at least one of the width and height of the characters is accomplished in basic steps.

3. The method of claim 1, wherein the printing machine includes drive means for moving the printing mechanism vertically and horizontally with respect to a record carrier, the movements taking place in vertical and horizontal basic steps, wherein the means for presetting character and line spacing comprises means for storing values corresponding to a plurality of basic horizontal steps for character width and space between characters and to a plurality of basic steps vertical for character height and space between lines, and wherein the step of reducing at least one of the character and line spacing is accomplished in basic steps.

4. In a method for filling in a form by using a printing machine to print at least one line of text within an addressed text field having boundaries which accommodate a predetermined text line length, the printing machine including a movable printing mechanism which is able to print characters in different sizes, a processor to control the printing machine, form memory means for storing at least one of positions and sizes of text fields on forms so as to control the printing position movement of the printing mechanism within the boundaries of a text field, a text data memory from which stored text is printed out automatically, means for presetting character and line spacing, and means for generating an error signal, the improvement comprising:
  before the text stored in the text data memory is printed out on the form in the addressed text field, comparing the length of the stored text with the predetermined line length accommodated by the addressed text field;
  if the length of the stored text exceeds the predetermined line length, reducing at least one of the character and line spacing and reducing at least one of the width and height of the characters to condense the text; and
  activating the means for generating an error signal without printing out the stored text if the text is condensed to a prdetermined limit but still exceeds the predetermined line length.

5. A printing machine for filling in a form by printing at least one line of text within an addressed text field having boundaries which accommodate a predetermined text line length, comprising:
  a movable printing mechanism which is able to print characters in different sizes;
  drive means for moving said printing mechansim with respect to the form, the movements taking place in vertical and horizontal basic steps;
  form memory means for storing at least one of the positions and sizes of text fields on forms so as to control the printing position movement of said printing mechanism within the boundaries of a text field;
  a text data memory from which stored text is printed out automatically;
  means for presetting character and line spacing, said means including first register means for storing a value indicating character spacing and second register means for indicating line spacing; and
  calculating and control circuit means, operatively connected to said printing mechanism, drive means, form memory means, text data memory, and first and second register means, for comparing the length of the stored text with the predetermined line length accommodated by the addressed text field before the text stored in the text data memory is printed out on the form in the addressed text field, and for reducing at least one of the character and line spacing to condense the text if the length of the stored text exceeds the predetermined line length, said calculating and control circuit means including
    a counter to determine the number of horizontal basic steps in the text stored in said text data memory,
    means for determining, in basic steps, the predetermined line length accommodated by the addressed text field,
    comparator means for comparing the number of basic steps of the predetermined line length with the content of the counter, and
    means for reducing at least one of the character and line spacing and for reducing at least one of the character height and width in dependence on the result of the comparison by said comparator means.

6. A method for filling in a form by using a printing machine to print text within an addressed text field having boundaries which accommodate text of a predetermined height and width, the printing machine including a movable printing mechanism, a processor to control the printing machine, form memory means for storing the positions and boundaries of text fields on forms so as to control the printing position movement of the printing mechanism within the boundaries of a text field, a text data memory from which stored text is printed out automatically, and means for presetting character and line spacing, said method comprising the steps of:
  (a) before the text stored in the text data memory is printed out on the form in the addressed text field, comparing the length of the stored text, when the preset character spacing is used, with the predetermined width accommodated by the addressed text field;
  (b) if the comparison of step (a) indicates that th length of the stored text does not exceed the predetermined width when the preset character spacing is used, activating the printing mechanism to print the stored text on the form as a single text line;
  (c) if the comparison of step (a) indicates that the length of the stored text exceeds the predetermined width when the preset character spacing is used, breaking the stored text into segments to generate a plurality of text lines;
  (d) before the text lines generated in step (c) are printed out on the form in the addressed text field, comparing the height of the text lines, when the preset line spacing is used, with the predetermined height accommodated by the addressed text field;

(e) if the comparison of step (d) indicates that the height of the text lines does not exceed the predetermined height when the preset line spacing is used, activating the printing mechanism to print the text lines on the form;

(f) if the comparison of step (d) indicates that the height of the text lines exceeds the predetermined height when the preset line spacing is used, condensing the text by reducing both the character spacing and the line spacing;

(g) before the condensed text of step (f) is printed out on the form in the addressed text field, comparing the size of the condensed text with the predetermined height and width; and (h) if the comparison of step (g) indicates that the size of the condensed text does not exceed the predetermined height and width, activating the printing mechanism to print the condensed text on the form.

7. The method of claim 6, wherein the printing mechanism comprises means for printing characters in different sizes, and further comprising the step of reducing at least one of the width and height of the characters if the comparison of step (g) indicates that the size of the condensed text exceeds the predetermined height and width.

8. The method of claim 6, wherein the printing machine includes drive means for moving the printing mechanism vertically and horizontally with respect to a record carrier, the movement taking place in vertical and horizontal basic steps of predetermined length, wherein the means for presetting character and line spacing comprises means for storing values corresponding to a plurality of basic horizontal steps for character width and space between characters and to a plurality of basic vertical steps for character height and space between lines, and wherein step (f) is accomplished in basic steps.

9. The method of claim 8, further comprising the step of signalling an error if the comparison of step (h) indicates that the size of the condensed text exceeds the predetermined height and width.

* * * * *